(12) United States Patent
Klein et al.

(10) Patent No.: US 9,935,705 B2
(45) Date of Patent: *Apr. 3, 2018

(54) FRAME STRUCTURE FOR AN ADAPTIVE MODULATION WIRELESS COMMUNICATION SYSTEM

(71) Applicant: Wi-LAN, Inc., Ottawa (CA)

(72) Inventors: Israel Jay Klein, Kfar Saba (IL); Kenneth L. Stanwood, Vista, CA (US); Steve Pollmann, Santee, CA (US); Frederick W. Price, Carlsbad, CA (US); Rami Hadar, San Diego, CA (US); Eli Arviv, Modi'in (IL); David Gazelle, Givat Shmuel (IL); Sheldon Gilbert, San Diego, CA (US)

(73) Assignee: WI-LAN INC., Ottawa (CA)

( * ) Notice: Subject to any disclaimer, the term of this patent is extended or adjusted under 35 U.S.C. 154(b) by 191 days.

This patent is subject to a terminal disclaimer.

(21) Appl. No.: 14/677,245

(22) Filed: Apr. 2, 2015

(65) Prior Publication Data

US 2015/0365162 A1   Dec. 17, 2015

Related U.S. Application Data

(60) Continuation of application No. 12/870,620, filed on Aug. 27, 2010, now Pat. No. 9,007,897, which is a
(Continued)

(51) Int. Cl.
*H04W 4/00*     (2018.01)
*H04B 7/26*     (2006.01)
(Continued)

(52) U.S. Cl.
CPC ......... *H04B 7/2656* (2013.01); *H04L 1/0003* (2013.01); *H04L 1/0004* (2013.01);
(Continued)

(58) Field of Classification Search
CPC ..................... H04L 1/0083; H04B 7/2656
(Continued)

(56) References Cited

U.S. PATENT DOCUMENTS 3,949,404 A   4/1976   Fletcher
4,495,619 A   1/1985   Acampora
(Continued)

FOREIGN PATENT DOCUMENTS

CA   2309472 A1   11/2001
EP   0507384 B1    3/1992
(Continued)

OTHER PUBLICATIONS

Andersen et al. "Prediction of Future Fading Based on Past Measurements." Vehicular Technology Conference, VTC 99, vol. 1, pp. 151-155.
(Continued)

*Primary Examiner* — Ricky Ngo
*Assistant Examiner* — Dewanda Samuel
(74) *Attorney, Agent, or Firm* — Procopio, Cory, Hargreaves & Savitch LLP

(57) ABSTRACT

A method of simplifying the encoding of a predetermined number of bits of data into frames including adding error coding bits so that a ratio of the frame length times the baud rate of the frame times he bit packing ratio of the data divided the total bits of data is always an integer. The method may also convolutionally encode the bits of data so that the same equation is also always an integer.

20 Claims, 7 Drawing Sheets

Related U.S. Application Data continuation of application No. 12/395,347, filed on Feb. 27, 2009, now Pat. No. 8,130,640, which is a continuation of application No. 10/962,957, filed on Oct. 12, 2004, now Pat. No. 7,519,023, which is a division of application No. 09/365,917, filed on Aug. 3, 1999, now Pat. No. 6,804,211.

(51) Int. Cl.
| | |
|---|---|
| *H04L 1/00* | (2006.01) |
| *H04L 25/03* | (2006.01) |
| *H04L 27/00* | (2006.01) |
| *H04W 72/04* | (2009.01) |
| *H04W 88/02* | (2009.01) |
| *H04W 88/08* | (2009.01) |

(52) U.S. Cl.
CPC .......... *H04L 1/0057* (2013.01); *H04L 1/0059* (2013.01); *H04L 1/0065* (2013.01); *H04L 1/0083* (2013.01); *H04L 25/03038* (2013.01); *H04L 27/0008* (2013.01); *H04W 72/0446* (2013.01); *H04L 2025/0342* (2013.01); *H04L 2025/03477* (2013.01); *H04W 88/02* (2013.01); *H04W 88/08* (2013.01); *Y02B 60/31* (2013.01)

(58) Field of Classification Search
USPC .................................. 370/329, 337, 346, 347
See application file for complete search history.

(56) References Cited

U.S. PATENT DOCUMENTS

| | | | |
|---|---|---|---|
| 4,763,325 A * | 8/1988 | Wolfe | H04B 7/2123 |
| | | | 370/322 |
| 4,931,250 A | 6/1990 | Greszczuk | |
| 4,975,906 A | 12/1990 | Takiyasu et al. | |
| 5,130,983 A | 7/1992 | Heffner et al. | |
| 5,157,395 A | 10/1992 | Del Signore et al. | |
| 5,297,144 A | 3/1994 | Gilbert et al. | |
| 5,361,399 A | 11/1994 | Linquist et al. | |
| 5,384,777 A | 1/1995 | Ahmadi et al. | |
| 5,402,422 A | 3/1995 | Liu et al. | |
| 5,404,374 A | 4/1995 | Mullins et al. | |
| 5,420,851 A | 5/1995 | Seshadri et al. | |
| 5,444,698 A | 8/1995 | Kito | |
| 5,457,687 A | 10/1995 | Newman | |
| 5,511,082 A | 4/1996 | How et al. | |
| 5,517,503 A | 5/1996 | Hess et al. | |
| 5,533,004 A * | 7/1996 | Jasper | H04B 7/2659 |
| | | | 370/204 |
| 5,533,024 A * | 7/1996 | Owada | H04W 72/06 |
| | | | 370/347 |
| 5,537,414 A | 7/1996 | Takiyasu et al. | |
| 5,546,411 A | 8/1996 | Leitch et al. | |
| 5,548,541 A | 8/1996 | Bierman et al. | |
| 5,594,720 A | 1/1997 | Papadopoulos et al. | |
| 5,594,738 A | 1/1997 | Crisler et al. | |
| 5,602,868 A | 2/1997 | Wilson | |
| 5,615,212 A | 3/1997 | Ruszczyk et al. | |
| 5,638,371 A | 6/1997 | Raychaudhuri et al. | |
| 5,638,374 A | 6/1997 | Heath | |
| 5,644,576 A | 7/1997 | Bauchot et al. | |
| 5,666,358 A | 9/1997 | Paratore et al. | |
| 5,675,573 A | 10/1997 | Karol et al. | |
| 5,684,791 A | 11/1997 | Raychaudhuri et al. | |
| 5,701,294 A * | 12/1997 | Ward | H04L 1/0003 |
| | | | 370/252 |
| 5,706,428 A | 1/1998 | Boer et al. | |
| 5,729,531 A | 3/1998 | Raith et al. | |
| 5,751,708 A | 5/1998 | Eng et al. | |
| 5,764,699 A | 6/1998 | Needham et al. | |
| 5,768,254 A | 6/1998 | Papadopoulos et al. | |
| 5,774,461 A | 6/1998 | Hyden et al. | |
| 5,790,070 A | 8/1998 | Natarajan et al. | |
| 5,790,551 A | 8/1998 | Chan et al. | |
| 5,809,427 A | 9/1998 | Perreault et al. | |
| 5,818,842 A | 10/1998 | Burwell et al. | |
| 5,828,695 A | 10/1998 | Webb | |
| 5,844,906 A | 12/1998 | Khelghatti et al. | |
| 5,859,619 A | 1/1999 | Wu et al. | |
| 5,859,848 A | 1/1999 | Miura et al. | |
| 5,886,995 A | 3/1999 | Arsenault et al. | |
| 5,890,055 A | 3/1999 | Chu | |
| 5,892,796 A | 4/1999 | Rypinski | |
| 5,909,469 A | 6/1999 | Frodigh et al. | |
| 5,912,920 A | 6/1999 | Marchok et al. | |
| 5,914,946 A | 6/1999 | Avidor | |
| 5,917,813 A | 6/1999 | Van Driel et al. | |
| 5,918,171 A | 6/1999 | Funke et al. | |
| 5,936,949 A | 8/1999 | Pasternak et al. | |
| 5,940,006 A * | 8/1999 | MacLellan | G01S 13/825 |
| | | | 235/375 |
| 5,946,313 A | 8/1999 | Allan et al. | |
| 5,963,543 A | 10/1999 | Rostoker et al. | |
| 5,970,062 A | 10/1999 | Bauchot | |
| 5,987,034 A | 11/1999 | Simon et al. | |
| 5,991,286 A * | 11/1999 | Labonte | H04L 1/0003 |
| | | | 370/337 |
| 6,006,069 A | 12/1999 | Langston | |
| 6,011,786 A | 1/2000 | Dent | |
| 6,016,311 A | 1/2000 | Gilbert et al. | |
| 6,016,313 A | 1/2000 | Foster et al. | |
| 6,016,401 A | 1/2000 | Rostoker et al. | |
| 6,026,133 A | 2/2000 | Sokoler et al. | |
| 6,031,827 A | 2/2000 | Rikkinen et al. | |
| 6,038,455 A | 3/2000 | Gardner et al. | |
| 6,052,365 A | 4/2000 | Bhagalia et al. | |
| 6,094,421 A | 7/2000 | Scott | |
| 6,108,374 A | 8/2000 | Balachandran et al. | |
| 6,112,080 A | 8/2000 | Anderson et al. | |
| 6,115,370 A | 9/2000 | Struhsaker et al. | |
| 6,122,293 A | 9/2000 | Frodigh et al. | |
| 6,125,148 A | 9/2000 | Frodigh et al. | |
| 6,128,293 A | 10/2000 | Pfeffer et al. | |
| 6,147,989 A | 11/2000 | Esaki et al. | |
| 6,151,318 A | 11/2000 | Woodward et al. | |
| 6,163,547 A | 12/2000 | De Vriendt et al. | |
| 6,167,031 A | 12/2000 | Olofsson et al. | |
| 6,175,550 B1 | 1/2001 | Van Nee | |
| 6,185,418 B1 | 2/2001 | MacLellan et al. | |
| 6,188,680 B1 | 2/2001 | Ohki | |
| 6,189,041 B1 | 2/2001 | Cox et al. | |
| 6,201,811 B1 | 3/2001 | Larsson et al. | |
| 6,201,813 B1 | 3/2001 | Klausmeier et al. | |
| 6,208,663 B1 * | 3/2001 | Schramm | H04L 1/0006 |
| | | | 370/465 |
| 6,208,873 B1 * | 3/2001 | Black | H04W 52/18 |
| | | | 455/115.3 |
| 6,233,231 B1 | 5/2001 | Felix et al. | |
| 6,252,865 B1 | 6/2001 | Walton et al. | |
| 6,330,278 B1 | 12/2001 | Masters | |
| 6,330,288 B1 * | 12/2001 | Budka | H04L 1/0003 |
| | | | 375/296 |
| 6,339,585 B1 | 1/2002 | Hulyalkar et al. | |
| 6,351,499 B1 | 2/2002 | Paulraj et al. | |
| 6,359,934 B1 | 3/2002 | Yoshida | |
| 6,366,961 B1 | 4/2002 | Subbiah et al. | |
| 6,370,112 B1 | 4/2002 | Voelker | |
| 6,392,994 B1 | 5/2002 | Dubuc | |
| 6,400,755 B1 | 6/2002 | Harris et al. | |
| 6,404,755 B1 | 6/2002 | Schafer | |
| 6,452,927 B1 | 9/2002 | Rich | |
| 6,452,964 B1 | 9/2002 | Yoshida | |
| 6,463,107 B1 | 10/2002 | Lindoff et al. | |
| 6,469,991 B1 | 10/2002 | Chuah | |
| 6,483,854 B1 | 11/2002 | Klausmeier et al. | |
| 6,493,342 B1 | 12/2002 | Breslow et al. | |
| 6,496,142 B1 | 12/2002 | Iinuma | |
| 6,549,759 B2 | 4/2003 | Arviv et al. | |
| 6,567,383 B1 | 5/2003 | Böhnke et al. | |
| 6,587,510 B1 * | 7/2003 | Minami | H04W 52/56 |
| | | | 375/285 |

(56) References Cited

U.S. PATENT DOCUMENTS

| | | |
|---|---|---|
| 6,608,841 B1 | 8/2003 | Koodli |
| 6,631,130 B1 | 10/2003 | Roy et al. |
| 6,665,292 B1 | 12/2003 | Bradshaw et al. |
| 6,665,296 B1 | 12/2003 | Sturza et al. |
| 6,671,328 B1 | 12/2003 | Poon et al. |
| 6,674,731 B1 | 1/2004 | Bradshaw et al. |
| 6,683,866 B1 | 1/2004 | Stanwood et al. |
| 6,697,364 B1 | 2/2004 | Kekki et al. |
| 6,701,129 B1 | 3/2004 | Hashem |
| 6,711,176 B1 | 3/2004 | Pezeshki-Esfahani |
| 6,721,286 B1 | 4/2004 | Williams et al. |
| 6,741,614 B1 | 5/2004 | Porter et al. |
| 6,747,977 B1 | 6/2004 | Smith et al. |
| 6,760,599 B1 | 7/2004 | Uhlik |
| 6,771,660 B1 | 8/2004 | Bourlas et al. |
| 6,785,252 B1 | 8/2004 | Zimmerman et al. |
| 6,804,251 B1 | 10/2004 | Limb et al. |
| 6,862,622 B2 | 3/2005 | Jorgensen |
| 6,870,932 B2 | 3/2005 | Jiang |
| 6,907,048 B1 | 6/2005 | Treadaway et al. |
| 6,918,034 B1 | 7/2005 | Sengodan et al. |
| 6,925,068 B1 | 8/2005 | Stanwood et al. |
| 6,931,030 B1 | 8/2005 | Dogan |
| 6,940,823 B1 | 9/2005 | Park et al. |
| 6,944,672 B2 | 9/2005 | Crow et al. |
| 6,963,751 B1 | 11/2005 | Kordsmeyer et al. |
| 6,967,936 B1 | 11/2005 | Laroia |
| 6,968,554 B1 | 11/2005 | Macdonald et al. |
| 6,970,941 B1 | 11/2005 | Caronni et al. |
| 7,006,525 B1 | 2/2006 | Jha |
| 7,006,526 B1 | 2/2006 | Biederman |
| 7,020,715 B2 | 3/2006 | Venkataraman et al. |
| 7,031,281 B1 | 4/2006 | Zhang |
| 7,050,407 B1 | 5/2006 | Frazer et al. |
| 7,061,935 B1 | 6/2006 | Roy et al. |
| 7,068,639 B1 | 6/2006 | Varma et al. |
| 7,085,291 B2 | 8/2006 | Zhang et al. |
| 7,197,022 B2 | 3/2007 | Stanwood et al. |
| 7,230,931 B2 | 6/2007 | Struhsaker |
| 7,260,405 B2 | 8/2007 | Kim et al. |
| 7,321,569 B2 | 1/2008 | Takagi et al. |
| 7,433,334 B2 | 10/2008 | Marjelund et al. |
| 7,443,814 B2 | 10/2008 | Agarwal et al. |
| 7,471,620 B2 | 12/2008 | Alazraki et al. |
| 7,551,937 B2 | 6/2009 | Kim et al. |
| 7,570,645 B2 | 8/2009 | Agarwal |
| 7,583,623 B2 | 9/2009 | Zimmerman et al. |
| 8,619,719 B2 | 12/2013 | Wengerter et al. |
| 2001/0015985 A1 | 8/2001 | Van Grinsven et al. |
| 2001/0048681 A1 | 12/2001 | Bilic et al. |
| 2002/0016852 A1 | 2/2002 | Nishihara |
| 2002/0089984 A1 | 7/2002 | Jiang |
| 2002/0090005 A1 | 7/2002 | Jiang et al. |
| 2002/0126677 A1 | 9/2002 | Hathaway et al. |
| 2002/0136170 A1 | 9/2002 | Struhsaker |
| 2003/0045307 A1 | 3/2003 | Arviv et al. |
| 2003/0125040 A1 | 7/2003 | Walton |
| 2003/0169722 A1* | 9/2003 | Petrus ............... H04B 7/2656 370/347 |
| 2004/0132459 A1 | 7/2004 | Varma et al. |
| 2005/0100120 A1 | 5/2005 | Barton et al. |
| 2005/0220110 A1 | 10/2005 | Agarwal |
| 2006/0062250 A1 | 3/2006 | Payne |
| 2006/0262808 A1 | 11/2006 | Lin et al. |
| 2008/0081651 A1 | 4/2008 | Kuroda et al. |
| 2011/0075684 A1 | 3/2011 | Zeng et al. |

FOREIGN PATENT DOCUMENTS

| | | |
|---|---|---|
| EP | 0622924 A2 | 11/1994 |
| EP | 0720405 A2 | 7/1996 |
| EP | 755164 A2 | 1/1997 |
| EP | 483546 B1 | 5/1997 |
| EP | 0845916 B1 | 12/1997 |
| EP | 0891060 A2 | 1/1999 |
| EP | 903883 A2 | 3/1999 |
| EP | 913968 A1 | 5/1999 |
| EP | 915592 A1 | 5/1999 |
| EP | 917316 A2 | 5/1999 |
| EP | 1073301 A1 | 1/2001 |
| EP | 0944200 B1 | 6/2009 |
| JP | 1041876 A | 2/1998 |
| JP | 11-266231 A | 9/1999 |
| WO | 97/13388 A1 | 4/1997 |
| WO | 98/010566 | 3/1998 |
| WO | 98/10568 A1 | 3/1998 |
| WO | 9827747 A2 | 6/1998 |
| WO | 9851111 A1 | 11/1998 |
| WO | 9909775 A2 | 2/1999 |
| WO | 99/012281 | 3/1999 |
| WO | 9921313 A2 | 4/1999 |
| WO | 99/38343 A2 | 7/1999 |
| WO | 99/39532 A1 | 8/1999 |
| WO | 00/01188 A1 | 1/2000 |
| WO | 00/021235 | 4/2000 |
| WO | 00/028694 | 5/2000 |
| WO | 0072626 A1 | 11/2000 |
| WO | 0076109 A1 | 12/2000 |
| WO | 0105100 A1 | 1/2001 |
| WO | 0108369 A1 | 2/2001 |
| WO | 0110046 A2 | 2/2001 |
| WO | 0133772 A1 | 5/2001 |
| WO | 92/22162 A1 | 12/2002 |

OTHER PUBLICATIONS

Bender et al. "CDMA/HDR: A Bandwidth Efficient High Speed Wireless Data Service for Nomadic Users." Communications Magazine, IEEE. 38(7):70-77. Jul. 2000.
Cable Television Laboratories, Inc., "Data-Over-Cable Service Interface Specifications Radio Frequency Interface Specification", SP-RFIv1.1-101-990311, 1999-2005, 320 pages.
Dutton. "Asynchronous Transfer Mode (ATM) Technical Overview." 2.sup.nd Edition, Prentice Hall, Oct. 1995, Chap. 3, pp. 21-25.
International Preliminary EXamination Report for PCT/US00/29687 dated Dec. 18, 2001.
International Search Report for PCT/US00/20577 dated Jan. 5, 2001, 5 pages.
International Search Report for PCT/US00/29687 dated Mar. 21, 2001, 3 pages.
International Search Report for PCT/US01/43582 dated Aug. 20, 2002, 3 pages.
Jain. "On the Impact of Channel and Channel Quality Estimation on Adaptive Modulation." Dec. 2002, 92 pages.
Lee. "Convolutional Coding, Fundamentals and Applications." Artech House, Inc. 1997, p. 11-51.
Lin et al. "Error Control Coding, Fundamentals and Applications." Prentice-Hall Computer Applications in Electrical Engineering Series., 1993, pp. 315-349.
Matsuoka et al. "Adaptive Modulation System with Variable Coding Rate Concatenated Code for High Quality Multi-Media Communication Systems." Apr. 28, 1996. IEEE. pp. 487-491.
Narlikar et al. "Designing Multihop Wireless Backhand Networks with Delay Guarantees." Bell Labs, 2005.
Notice of Allowance for U.S. Appl. No. 09/430,379 dated Jul. 28, 2003.
Office Action issued in U.S. Appl. No. 09/430,379 dated Jan. 15, 2003.
Papadopoulos et al. "Reduction of MiXed Co-channel Interference in Microcellular STDD Systems." Vehicular Technology Conference. 1995 IEEE 45.sup.th, vol. 2, pp. 759-763.
Pons et al. "Bit Error Rate Characterisation and Modelling for GSM." IEEE 1998, pp. 3722-3727.
Redl et al. "An Introduction to GSM." Artech House, Inc. 1995, pp. 84-85 and 95.
Sampei et al. "Adaptive Modulation/TDMA Scheme for Personal Multi-Media Communication System." Proceedings of the Global Telecommunications Conference, U.S., New York, IEEE. Nov. 28, 1994, pp. 989-993.

(56) References Cited

OTHER PUBLICATIONS

Sater et al. "Media Access Control Layer Proposal for the 802.16.1 Air Interface Specification." IEEE 802.16 Broadband Wireless Access Working Group, Online! Jul. 7, 2000, XP002210334 retrieved from the Internet: <URL: http://wirelessman.org/tgl/mac/contrib/802161mc-00.sub.1321rl.pdf> retrieved Aug. 20, 2002, pp. 69-80.
Shannon. "A Mathematical Theory of Communication." Bell System Technical Journal, pp. 379-423 (Part 1), 623-656 (Part 2), Jul. 1948.
Torrance et al. "Upper bound performance of adaptive modulation in a slow Rayleigh fading channel." IEEE Electronics Letters. 32(8):718-719, Apr. 11, 1996.
U.S. District Court, Northern District of California, "Amended Complaint for Declaratory Judgment Demand for Jury Trial" filed Sep. 30, 2008 in Case No. 5:08-cv-4555.
Ue et al. "Symbol Rate and Modulation Level Controlled Adaptive Modulation/TDMA/TDD for Personal Communication Systems." Proceedings of the Vehicular Technology Conference, U.S., New York, IEEE, vol. Conf. 45, Jul. 25, 1995, pp. 306-310.
Ulm et al. "Data-Over-Cable Interface Specifications, Radio Frequency Interface Specification." Hewlett Packard Interim Specification, Doc. Control No. SP-RFII01-970321, published Mar. 21, 1997 by MCNS Holdings, L.P. Section 6, pp. 43-85.
Wolf et al. "On the Weight Distribution of Linear Block Codes Formed From Convolutional Codes." IEEE, IEEE Transactions on Communications, vol. 44, Sep. 9, 1996.
Alwakeel et al. "DPAP: A Dynamic Polling Based Access Protocol for Wireless Networks", The Ninth IEEE International Symposium on Personal, Indoor and Mobile Radio Communications, Sep. 1998. pp. 1126-1130.
Arad. "Resource Allocation and Channel Access Control in Multimedia Wireless CDMA Networks", Ph.D. Thesis, University of Toronto, 2000.
Aruncahalam et al. "DOCSIS based MAC layer proposal for BWA", IEEE 802.16mc-99/04, Oct. 21, 1999.
Blogh et al. "Dynamic Channel Allocation Techniques Using Adaptive Modulation and Adaptive Antennas", IEEE Journal on Selected Areas in Communications, Sep. 1999.
Catreux et al. "Adaptive Modulation and MIMO Coding for Broadband Wireless Data Networks", IEEE Communications Magazine, Jun. 2002.
Cavers. "Variable-Rate Transmission for Rayleigh Fading Channels", IEEE Transactions on Communications, vol. Com-20, No. 1, Feb. 1972.
Chen et al. "A Comparison of MAC Protocols for Wireless Local Networks Based on Battery Power Consumption", IEEE Proceedings, INFOCOM '98. Seventeenth Annual Joint Conference of the IEEE Computer and Communications Societies, Apr. 1998.
Chen et al. "Comparative analysis of wireless ATM channel access protocols supporting multimedia traffic", Baltzer Journals, Sep. 17, 1997.
Chua et al. "Adaptive Coded Modulation for Fading Channels", Proc. IEEE Int. Conference Communications, 1997.
Chuang et al. "High-Speed Wireless Data Access Based on Combining EDGE with Wideband OFDM", Topics in Broadband Access, IEEE Communications Magazine, Nov. 1999.
Chuang. "An OFDM-based System with Dynamic Packet Assignment and Interference Suppression for Advanced Cellular Internet Service", IEEE Global Telecommunications Conference, 1998. GLOBECOM 1998. The Bridge to Global Integration. Nov. 1998. pp. 974-979.
Frigon. "Dynamic Reservation TDMA Medium Access Control Protocol for Wireless ATM Networks", M.A.S. Thesis, University of British Columbia, Aug. 1998.
Garg et al. "Third Generation (3G) Mobile Communications Systems", 1999 IEEE International Conference on Personal Wireless Communication, Feb. 1999.
Goldsmith et al. "Adaptive Coded Modulation for Fading Channels", IEEE Transactions on Communications, vol. 46, No. 5, May 1998.
Goldsmith. "Adaptive Modulation and Coding for Fading Channels" Proceedings of the 1999 IEEE, Information Theory and Communications Workshop, Jun. 1999.
Grünheid et al. "Adaptive Modulation and Multiple Access for the OFDM Transmission Technique" Wireless Personal Communications, vol. 13, Issue 1, May 2000.
Hakegard. "Coding and Modulation for LMDS and Analysis of the LMDS Channel", Journal of Research of the National Institute of Standards and Technology, vol. 105, No. 5, Sep.-Oct. 2000.
Holtkamp et al. "A Distributed Media Access Control (DMAC) for Wireless ATM Networks", Preliminary Version, 5th International Conference on Telecommunication Systems—Modelling and Analysis, Mar. 1997.
Ikeda et al. "The performance of adaptive modulation with dynamic channel assignment in multimedia traffic", IEEE 1998 International Conference on Universal Personal Communications, 1998. ICUPC '98, Oct. 1998.
Jagannath et al. "An Adaptive Data Link Layer Protocol for Wireless ATM Networks", M.S. Thesis, University of Mysore, 1994.
Jeong et al. "CDMA/TDD System for Wireless Multimedia Services with Traffic Unbalance Between Uplink and Downlink", IEEE Journal on Selected Areas in Communications, vol. 17, No. 5, May 1999. pp. 939-946.pp. 523-527.
Kim et al. "Adaptive Coded-Modulation in Multipath Fading Channels", 1999 IEEE Vehicular Technology Conference, Sep. 1999.
Kim et al. "Adaptive Coded-Modulation in Slow Fading Channels", Journal of Communications and Networks, vol. 1, No. 2, Jun. 1999.
Klein. "PHY layer proposal for BWA", IEEE 802.16.1pc-00/04, Dec. 24, 1999.
Lau et al. "On channel adaptive multiple access control with queued transmission requests for wireless ATM", ATM 2000. Proceedings of the IEEE Conference on High Performance Switching and Routing, Jun. 2000. pp. 473-481.
Leiba. "Amber Proposal for 802.16 MAC Layer", IEEE 802.16mc-99/06, Oct. 28, 1999.
Leung et al. "Dynamic Allocation of Downlink and Uplink Resource for Broadband Services in Fixed Wireless Networks", IEEE Journal on Selected Areas in Communications, vol. 17, No. 5, pp. 990-1006, May 1999.
Lindell et al. "Radio Access Technology Evolution", Ericsson Review, 1993.
Linnenbank et al. "A Request-TDMA Multiple-Access Scheme for Wireless Multimedia Networks", In: Third International Workshop on Mobile Multimedia Communications, MoMuC-3, Sep. 25-27, 1996.
Mollenauer et al. "MAC Proposal for IEEE 802.16.1", IEEE 802.16mc-00_07, Jan. 5, 2000.
Mollenauer et al, "MAC Proposal for IEEE 802.16.1", IEEE 802.16.1mc-00/10, Feb. 25, 2000.
Mollenauer et al. "An Efficient Media Access Control Protocol for Broadband Wireless Access Systems", IEEE 802.16mc-99/10, Oct. 28, 1999.
Motorola. "Adaptive Modulation and Coding (AMC)", TSGR1#17(00)1395, Oct. 20-24, 2000.
Nandra et al. "Adaptation Techniques in Wireless Packet Data Services", IEEE Communications Magazine, Jan. 2000.
Naper. TS 25.225 V0.1.0 (Sep. 1999), "GSM 03.60", Sep. 1999.
Passas et al. "MAC protocol and traffic scheduling for wireless ATM networks", Mobile Networks and Applications, May 2001.
Pearce et al. "Comparison of counter-measures against slow Rayleigh fading for TDMA systems", IEEE Colloquium on Advanced TDMA Techniques and Applications (Digest No: 1996/234), Oct. 28, 1996.
Rohling et al. "Adaptive Coding and Modulation in an OFDM-TDMA Communication System", 48th IEEE Vehicular Technology Conference, VTC 98, May 1998.
Rohling et al. "Performance of an OFDM-TDMA Mobile Communication System", IEEE Proceedings on the Conference on Vehicular Technology, 1996.

(56) References Cited

OTHER PUBLICATIONS

Third Generation Partnership Project Technical Report, Technical Specification Group Radio Access Network, 3GPP TR 25.848 V4.0.0 (Mar. 2001) "Physical Layer Aspects of UTRA High Speed Downlink Packet Access (Release 4)", Mar. 2001.
Third Generation Partnership Project Technical Report, Technical Specification Group, Working Group, 3GPP TS 25.301 V3.2.0 (Oct. 1999) "Radio Interface Protocol Architecture", Oct. 1999.
Lupo et al. "Dynamic Resource Allocation with a Soft Handover Procedure for Application in a Broadband System", IEEE VTS 50th Vehicular Technology Conference, 1999. VTC 1999—Fall, Sep. 1999. pp. 2111-2115.
IEEE 802.16.1mc-00/21r1 Broadband Wireless Access Working Group, Media Access Control Layer Proposal for the 802.16.1 Air Interface Specification. Jul. 7, 2000.

\* cited by examiner

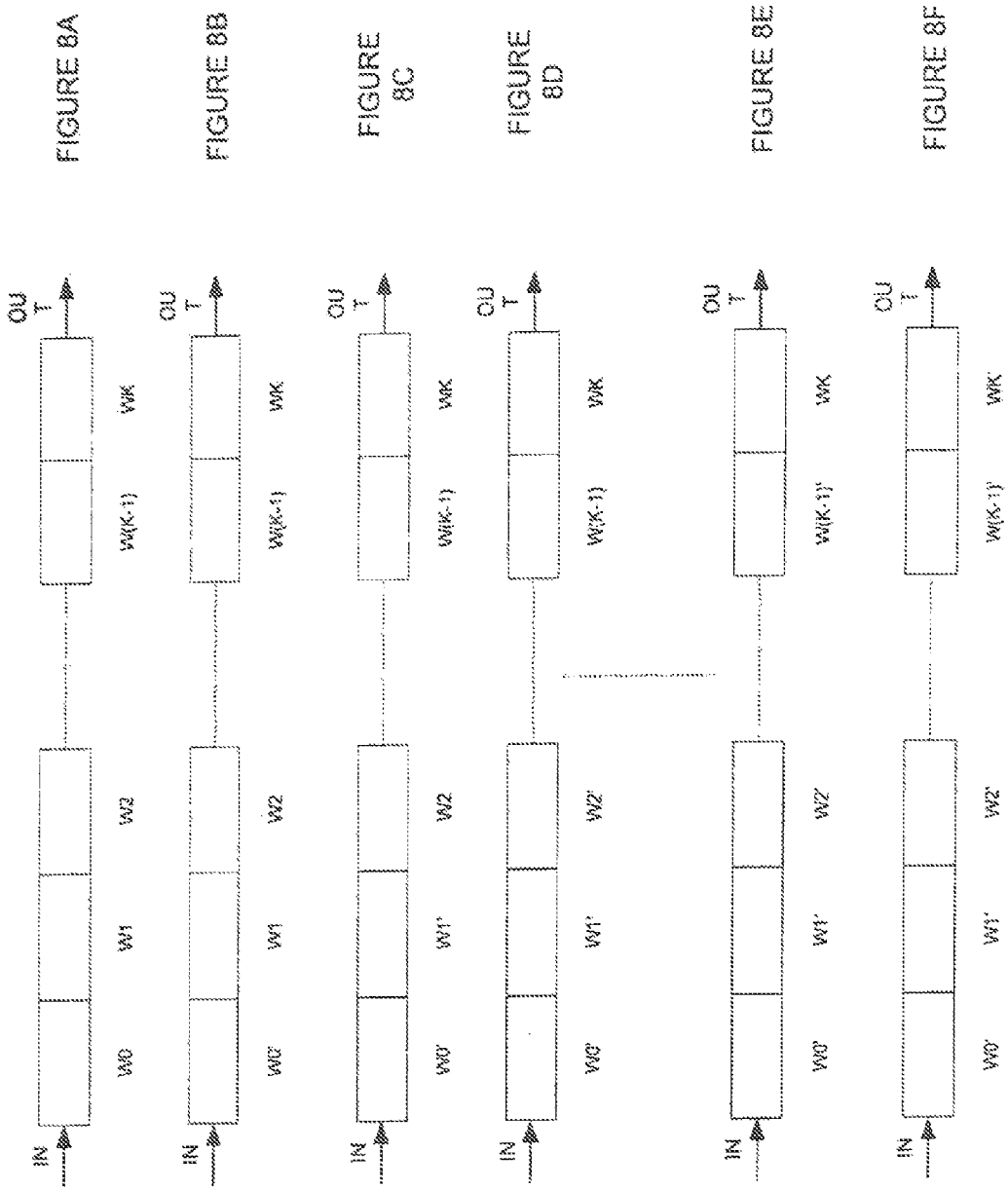

FRAME STRUCTURE FOR AN ADAPTIVE MODULATION WIRELESS COMMUNICATION SYSTEM

RELATED APPLICATIONS

This application is a continuation of U.S. patent application Ser. No. 12/870,620, filed Aug. 27, 2010, now issued as U.S. Pat. No. 9,007,897 issued on Apr. 14, 2015; which is a continuation of U.S. patent application Ser. No. 12/395,347, filed Feb. 27, 2009, now issued as U.S. Pat. No. 8,130,640 issued on Mar. 6, 2012; which is a continuation of U.S. application Ser. No. 10/962,957 filed Oct. 12, 2004, now issued as U.S. Pat. No. 7,519,023 issued on Apr. 14, 2009; which is a divisional of U.S. application Ser. No. 09/365,917 filed Aug. 3, 1999, now issued as U.S. Pat. No. 6,804,211 issued on Oct. 12, 2004, all of which are incorporated herein by reference in their entirety.

BACKGROUND OF THE INVENTION

1. Field of the Invention

This invention relates to frame structures for communication systems and more particularly to frame structures for adaptive modulation wireless communication systems.

2. Description of Related Art

A wireless communication system facilitates two-way communication between a plurality of customer premises equipment ("CPE") and a network infrastructure. Exemplary systems include mobile cellular telephone systems, personal communication systems (PCS), and cordless telephones. The objective of these wireless communication systems is to provide communication channels on demand between the users connected to a CPE and a base station in order to connect the user of a CPE with a network infrastructure (usually a wired-line system). In multiple access wireless schemes, the basic transmission unit is commonly frames of time. The frames are commonly divided into a plurality of time slots. The time slots of the frames may hold different kinds of data including control data and user information or data. In order to manage the use of the time slots of a frame, the time slots may be assigned or allocated to one or more CPEs. In this case, a CPE receiving or having an allocation of time slots may parse the allocation of the slots between one or more users associated with the CPE. CPEs typically communicate with a base station using a "duplexing" scheme that allows for the exchange of information in both directions of connection. In this scheme, the time slots of each frame may be allocated to data being transmitted from a base station to CPEs and to data being transmitted from CPEs to a base station.

Transmissions from a base station to a CPE are commonly referred to as "downlink" transmissions. Transmissions from a CPE to a base station are commonly referred to as "uplink" transmissions. Prior art wireless communication systems typically employ time division duplexing (TDD) to facilitate the exchange of information between base stations and CPEs where TDD is well known in the art. In TDD systems, duplexing of transmissions between a base station and associated CPEs is performed in the time domain. Further, the CPEs typically communicate with their associated base station with signals having a specific pre-defined radio frequency. In TDD systems, the bandwidth or channel of the signal is time-divided into frames having repetitive time periods or time "slots". The time slots are employed for uplink and downlink transmissions between the base station and associated CPEs.

When a wireless system is implemented in a region, the region is commonly divided into cells with a base station located within each cell. Each base station in a cell of the wireless system ideally provides communication between CPEs located in the cell. The size or configuration of a cell is generally determined as a function of the physical location of the base station, the location of buildings and other physical obstructions within the cell. The maximum bit per symbol rate modulation scheme that may be employed with a cell may be limited due to channel interference and the implementation or modem complexity of CPEs within the cell. Channel interference may occur between adjacent time slots assigned to different CPEs within a cell due to distortion of signals between the base station in the cell and the CPEs. The signals are commonly distorted by destructive multi-path replication of the signals (where the signals are reflected off physical objects in the cell). In addition, the signals are commonly distorted by atmospheric conditions (such as rain). Thus, in order to have duplex communications between all CPEs associated with a base station in a cell, a modulation scheme having a bit per symbol rate that enables communication between all CPEs associated with the base station is selected.

It is noted, however, that the channel interference between CPEs and a base station varies for each CPE, e.g., as a function of the physical barriers between the base station and the CPE. Consequently, the maximum bit per symbol rate modulation scheme (i.e., having acceptable error rates given the channel interference) that may be used to communicate between each CPE and the base station may vary. In addition, the implementation or modem complexity of the CPEs associated with the base station may also vary where some CPEs may be able to support higher bit per symbol rate modulation schemes than others associated with the base station. Accordingly, the selection of one low bit per symbol rate modulation scheme for all CPEs where some CPEs may support a higher bit per symbol rate modulation in a cell may not maximize bandwidth utilization. The use of different or variable bit per symbol rate modulation schemes for different CPEs associated with a cell may increase bandwidth utilization. Unfortunately, variable bit per symbol rate modulation is not used for communication between base stations and associated CPEs due to its complexity. In particular, variable bit per symbol rate modulation schemes normally require complex CPE demodulators where some CPEs may already have limited implementation or modem complexity. The need thus exists for frame structures and frame construction techniques that enable variable bit per symbol rate modulation for CPEs and base stations within a cell that does not increase the complexity of CPEs. The present invention provides such a frame structure and frame construction techniques.

SUMMARY OF THE INVENTION

The present invention includes a method that orders or assigns downlink time slots based on the complexity of the modulation data to be stored in the downlink time slots. Preferably, the downlink time slots are sorted from the least complex modulation scheme to the most complex modulation scheme. In one embodiment, the method assigns portions of at least two downlink time slots to at least two receiving units where the modulation scheme employed by the at least two units may vary. The method first determines the complexity of the modulation scheme employed by the at least two units. Then the method assigns portions of the at least two time slots to the at least two units based on the complexity of the modulation scheme they employ. As noted, ideally, portions of the at least two downlink time slots are assigned from the least complex modulation scheme to the most complex modulation scheme. In other embodiments, the method may first order the at least two units as a function of the complexity of the modulation scheme they employ. Then this method may assign portions of the at least two time slots based on the order of the at least two units.

The method may further order uplink time slots of a frame based on the complexity of the modulation data to be stored in the uplink time slots. Preferably, the uplink time slots are also sorted from the least complex modulation scheme to the most complex modulation scheme. In one embodiment, the method assigns at least two uplink time slots to at least two transmitting units where the modulation scheme employed by the at least two transmitting units may vary. The method first determines the complexity of the modulation scheme employed by the at least two transmitting units. Then the method assigns the at least two time slots to the at least two transmitting units based on the complexity of the modulation scheme they employ. As noted, ideally, the at least two uplink time slots are assigned from the least complex modulation scheme to the most complex modulation scheme. In other embodiments, the method may first order the at least two transmitting units as a function of the complexity of the modulation scheme they employ. Then this method may assign the at least two uplink time slots based on the order of the at least two transmitting units.

The present invention also includes a method that orders downlink time slots based on the bit per symbol rate of the modulation scheme employed to generate the data to be stored in the downlink time slots. Preferably, the downlink time slots are sorted from the lowest bit per symbol rate modulation scheme to the highest bit per symbol rate modulation scheme. In one embodiment, the method assigns portions of at least two downlink time slots to at least two receiving units where the bit per symbol rate modulation scheme employed by the at least two units may vary. The method first determines the bit per symbol rate of the modulation schemes employed by the at least two units. Then the method assigns portions of the at least two time slots to the at least two units based on the bit per symbol rate modulation schemes they employ. As noted, ideally, portions of the at least two downlink time slots are assigned from the lowest bit per symbol rate to the highest bit per symbol rate. In other embodiments, the method may first order portions of the at least two units as a function of the bit per symbol rate of the modulation schemes they employ. Then this method may assign portions of the at least two time slots based on the order of the at least two units.

The method may further order uplink time slots of a frame based on the bit per symbol rate of the modulation scheme employed to generate the data to be stored in the uplink time slots. Preferably, the uplink time slots are also sorted from the lowest bit per symbol rate to the highest bit per symbol rate. In one embodiment, the method assigns at least two uplink time slots to at least two transmitting units where the bit per symbol rate of the modulation scheme employed by the at least two transmitting units may vary. The method first determines the bit per symbol rate of the modulation scheme employed by the at least two transmitting units. Then the method assigns the at least two time slots to the at least two transmitting units based on the bit per symbol rate of the modulation scheme they employ. As noted, ideally, the at least two uplink time slots are assigned from the lowest bit per symbol rate modulation scheme to the highest bit per symbol rate modulation scheme. In other embodiments, the method may first order the at least two transmitting units as a function of the bit per symbol rate modulation scheme they employ. Then this method may assign the at least two uplink time slots based on the order of the at least two transmitting units.

The present invention also includes a method of determining the encoding Ld bits of data into a frame. The frame has a time length T and the frame is transmitted at a baud rate R. The method first determines the maximum fixed bit per symbol rate of modulation for the Ld bits of data. Then the method adds x error code bits where $(R*T*Bi)/(Ld+x)$ is an integer where Bi is the bit per symbol rate of the modulation scheme employed. It is noted that x may have a minimum value based on a minimum block error rate. Further, the x error code bits may be Reed-Solomon encoded error bits. In other embodiments, the method may determine the maximum bit per symbol rate, Bi of modulation scheme for the Ld bits of data. Then the method may add x error code bits where $(R*T*Bi)/(Ld+x)$ is an integer.

In a further embodiment, the method first selects a convolution ratio where the selected convolution ratio adds y convolution bits to the Ld bits of data after the convolution encoding of the Ld bits of data. Then the method adds x error code bits where $(R*T*Bi)/(Ld+x+y)$ is an integer. It is noted that in this method the convolution ratio may be modified so that $(R*T*Bi)/(Ld+x+y)$ is an integer. In addition, the number of x error bits may be selected so that $(R*T*Bi)/(Ld+x+y)$ is an integer.

The present invention also includes a method for determining the modulation scheme of a frame having a plurality of downlink time slots where one of the plurality of downlink slots contains control information. In this method the modulation scheme employed to generate the modulated data for the plurality of downlink time slots may vary for each of the plurality of downlink slots. In addition, the frame may be transmitted to a plurality of units where each of the plurality of units may support a modulation scheme having a maximum complexity. This method first determines the lowest modulation complexity supported by each of the plurality of units. Then the method sets the modulation complexity of the downlink slot of the plurality of downlink slots that contains control information to the determined lowest modulation complexity.

In this method, the downlink slot of the plurality of downlink slots that contains control information may be the first downlink slot in time order of the plurality of downlink slots. In addition, the method may also determine the complexity of the modulation scheme employed to generate the modulated data for at least two units of the plurality of units. Then the method may assign at least two time slots of the plurality of time slots to the at least two units based on the complexity of the modulation scheme employed to generate the modulated data for the at least two units. The assignment to the at least two units may be from the least complex modulation scheme to the most complex modulation scheme.

The present invention also includes a method for setting the values of weights of finite impulse response filter. In this case, the filter receives symbols having variable modulation rates and stores a plurality of the symbols where each stored symbol has a corresponding weight. The method first determines when a first symbol is received having a modulation rate different than the last stored symbol. Then the method changes the value of the weight that corresponds to the first symbol based on the modulation rate of the first symbol. The method may further include receiving a second symbol having a modulation rate the same as the modulation rate of said first symbol. Followed by changing the value of the weight that corresponds to the first symbol based on the modulation rate of the first symbol. More generally, the method changes the value of the weights that correspond to the first symbol based on the modulation rate of the first symbol as the first symbol propagates through the filter.

The details of the preferred and alternative embodiments of the present invention are set forth in the accompanying drawings and the description below. Once the details of the invention are known, numerous additional innovations and changes will become obvious to one skilled in the art.

BRIEF DESCRIPTION OF THE DRAWINGS

FIGS. 8A to 8F are diagrams illustrating a method of the invention that changes weights of a FIR filter as new symbols propagate through the filter.

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Figure 1:
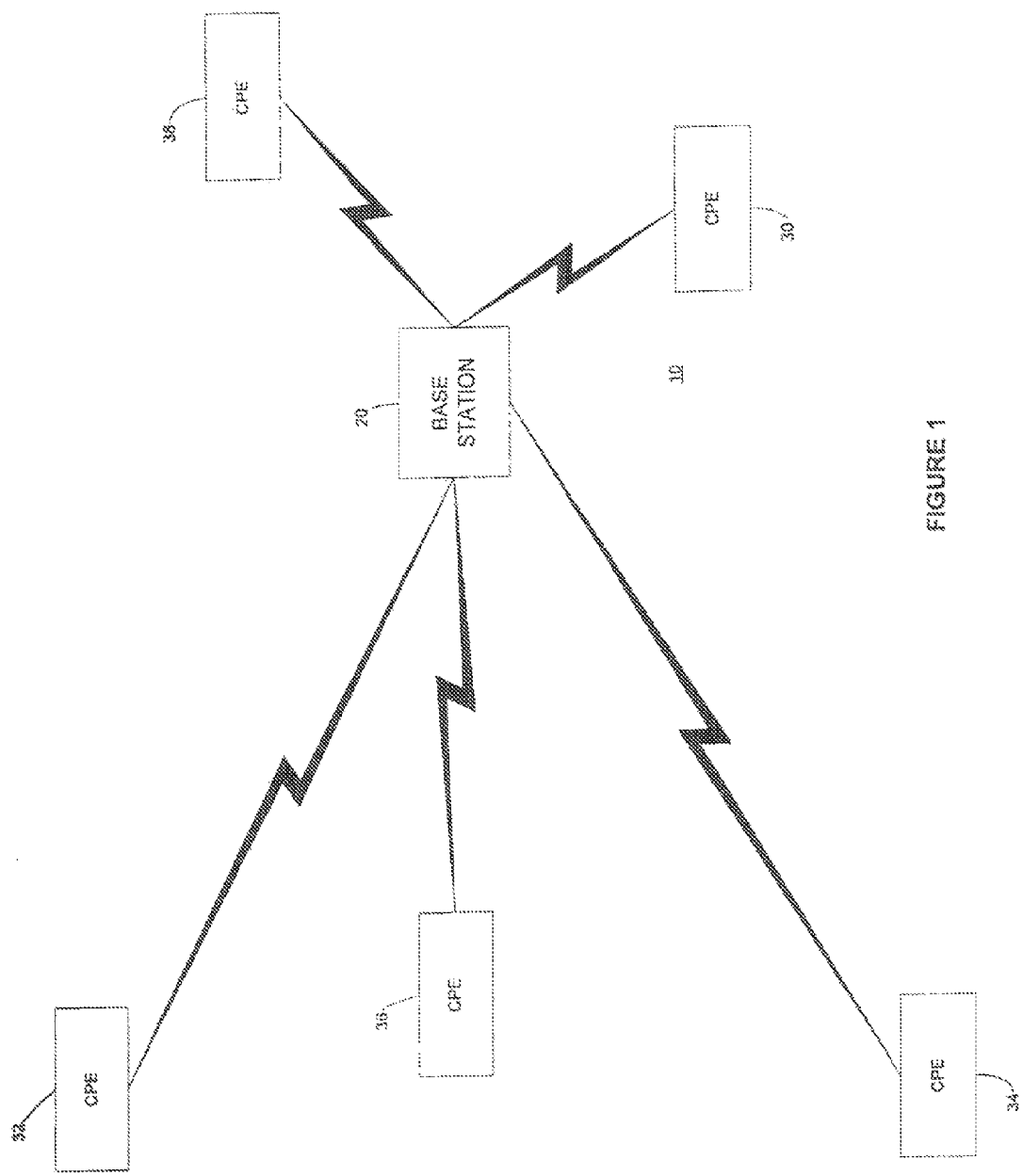
FIG. 1 is a diagram of an exemplary cell configuration with a base station and several CPEs associated with the cell.

The present invention includes an improved frame structure and a process of generating a frame structure for use in wireless communication systems employing adaptive modulation. Adaptive modulation includes varying the bit per symbol rate modulation scheme or modulation complexity of signals transmitted between a CPE and a base station as a function of channel interference of the signals or implementation or modem complexity of the CPE. FIG. 1 is a diagram of an exemplary cell 10 that includes a base station 20 located centrally in the cell 10 and a plurality of CPEs 30, 32, 34, 36, 38 associated with the base station. FIG. 1 does not shown buildings or other physical obstructions (such as trees or hills, for example), that may cause channel interference between signals of the CPEs.

As described above, the maximum bit per symbol rate modulation scheme or technique or most complex modulation scheme selected for use in the cell 10 is normally determined as a function of the channel interference between CPEs and the implementation or modem complexity of the CPEs. As also described above, the selection of a single maximum bit per symbol rate modulation technique based on the lowest bit per symbol rate modulation scheme supported by all CPEs may not optimize bandwidth utilization within the cell 10. In particular, lower channel interference between some CPEs (such as units 38, 30 for example), may permit the use of a higher bit modulation technique or more complex modulation scheme that has an error level below the maximum desirable error level. Adaptive bit-rate modulation or variable bit-rate modulation between different CPEs, however, usually requires complex transmitters and receivers in the CPEs where the CPEs may already have limited implementation or modem complexity.

As noted above, the frame structure is divided into a plurality of downlink and uplink slots. Each downlink time slots may be used to store data to be received by a number of users where a user identifies their data by an address or other label. Uplink time slots are commonly assigned to individual users for transmission of data from the user to another user or system via the base station. To maximize bandwidth utilization and minimize modulator complexity in the base station and associates CPEs, the present invention simplifies the configuration of data to inserted into the time slots. Briefly, data blocks are ideally parsed into an integer number of time slots. This process is described in detail below with reference to FIG. 4. Second, the present invention, orders or sorts the placement of data in the downlink and uplink time slots are a function of modulation complexity or bit per symbol rate modulation scheme employed to generate the data to be placed in the time slots. As described below with reference to FIG. 3, this technique reduces the complexity of CPE modulators and the number of modulation scheme transitions in a frame.

Figure 2:
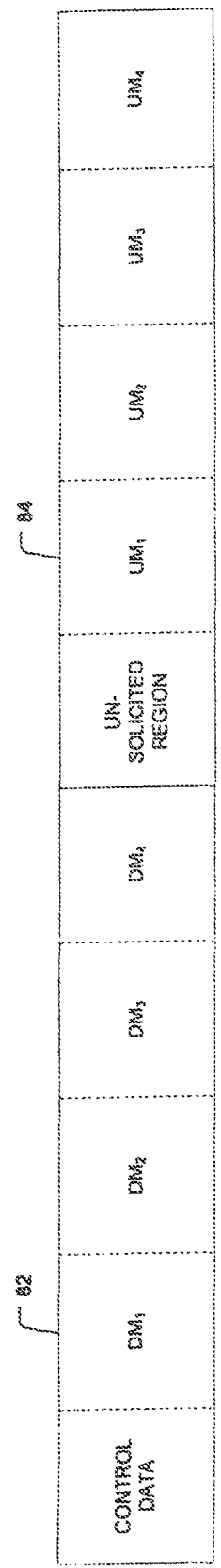
FIG. 2 is a diagram an exemplary time division duplex ("TDD") frame in accordance with the present invention.

FIG. 2 is diagram of an exemplary frame structure to be employed in a cell that enables adaptive bit per symbol rate modulation schemes to be employed in a frame structure without increasing the complexity of receivers and transmitters of CPEs associated with the cell and reducing the number of modulation scheme transitions within each frame. As shown in FIG. 2, the frame 80 includes a plurality of time slots. In this example there are ten time slots where the first five time slots contain downlink data 82 (from the base station 10), and the remaining five time slots contain uplink data 84 (to the base station 10 from a CPE). In this example, the downlink slots have a modulation bit per symbol rate of $DM_1$, $DM_2$, $DM_3$, and $DM_4$ where the four downlink time slots are assigned to at least four CPEs where the CPEs will retrieve data located in these slots based on their respective assignment. It is noted that many CPEs may be assigned to any one downlink time slot where each CPE retrieves its data from such a slot based on an address or identifier. Consequently, a CPE may only retrieve data from only a portion of a downlink time slot.

In addition, the uplink slots have a modulation bit per symbol rate of $UM_1$, $UM_2$, $UM_3$, and $UM_4$ where the four uplink time slots are commonly assigned to four CPEs where the CPEs will insert data in these slots based on their respective assignment. It is noted that in some embodiments a CPE may be assigned more than one uplink slot. Further, downlink control information may be located at the start of the downlink time slots and an unreserved time slot may be located at the beginning of the uplink time slots. It is obviously desirable that any CPE associated a cell be able to retrieve data located in the downlink control information time slot regardless of the CPE's location within the cell. In addition, each CPE should be able to insert data into the unreserved uplink time slot.

As described above, in an adaptive bit per symbol rate modulation system the modulation scheme may vary for each CPE and thus for each downlink and uplink time slot. In order to minimize the complexity of CPEs and base stations employed in such a system and reduce the number modulation scheme transitions within a frame, the present invention requires that $DM_1 \leq DM_2 \leq DM_3 \leq DM_4$ and $UM_1 \leq UM_2 \leq UM_3 \leq UM_4$. Thus, ideally, the data in the time slots is arranged from the least complex modulation scheme to the most complex modulation scheme. As noted, this technique reduces the number of modulation transitions, which may simplify the implementation of a base station using this frame structure 80. Note this also enables the base station and CPEs to train on the least complex data, which may lower error rates.

Further, ideally the downlink control information is ideally encoded using the least complex modulation scheme of the system and the information placed in the unreserved uplink time slot is also encoded using the least complex modulation scheme of the system. This ensures that every CPE associated with the cell will be able to receive or encode information within desirable error levels. Ideally, the control information indicates where the modulation transitions occur within the frame. An exemplary process 90 of assigning time slots of frame 80 as shown in FIG. 2 is presented with reference to FIG. 3.

Figure 3:
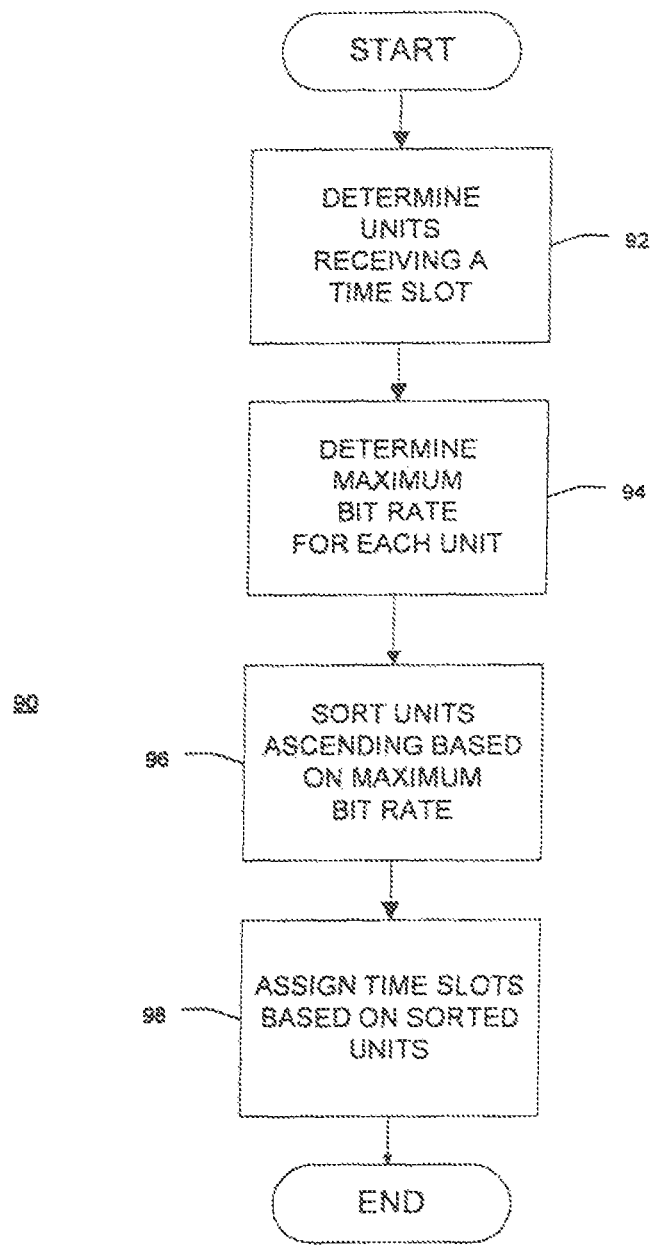
FIG. 3 is a flowchart of an exemplary process of assigning time slots of a TDD frame in accordance with the present invention.

As shown in FIG. 3, the first step, 92 of the process 90 includes determining which CPEs will receive at least one time slot in the next frame. In duplex systems, as described above, a CPE receiving data in a downlink time slot may also transmit data in an uplink time slot. In other systems, such as point to multi-point or multi-cast systems, there may be more downlink time slots than uplink time slots. Then (in step 94) the most complex modulation scheme or maximum bit per symbol rate of the modulation scheme employed by the CPE is determined for each CPE. As stated above, the most complex modulation scheme or maximum bit per symbol rate modulation scheme may be determined as a function of channel interference of signals of a CPE and the maximum desirable error level and the implementation or modem complexity of the CPE.

In a preferred embodiment, Binary Phase Shift Keying ("BPSK") modulation may be selected for the least complex modulation scheme. In BPSK, the bit per symbol rate, $B_I$ of the modulation scheme is one, i.e., each symbol represents one bit. $B_I$ could also be called the modulation scheme efficiency, i.e., how efficient the scheme encodes data. A Quadrature Amplitude Modulation (QAM) of four may be used for an intermediate modulation scheme. In QAM 4, the bit per symbol rate, $B_I$ of the modulation scheme is two, i.e., each symbol represents two bits. Higher quadrature amplitude modulations may be used for more complex modulation schemes, e.g., QAM 64 where the bit per symbol rate, $B_I$ of the modulation scheme is six, i.e., each symbol represents six bits. The modulation complexity or bit per symbol rate modulation scheme may be modified from frame to frame or remain constant for a plurality of frames for a particular CPE. Further, a CPE may select or indicate a desired modulation complexity or scheme.

Upon determination of the modulation complexity or bit per symbol rate modulation scheme to be used to encode data for each of the CPEs, in step 96 the CPEs are sorted in ascending order based on the selected modulation complexity or bit per symbol rate modulation scheme, i.e., from the lowest bit per symbol rate modulation scheme to the highest bit per symbol rate modulation scheme or least complex modulation scheme to the most complex modulation scheme. Finally, the time slots of a frame are allocated or assigned to the CPEs in their sorted order from the lowest bit per symbol rate modulation scheme to the highest bit per symbol rate modulation scheme or from the least complex modulation scheme to the most complex modulation scheme. As noted above, frames are constructed using this process to reduce the complexity of base stations and CPEs that insert or retrieve data therefrom. It is noted that even though modulation schemes may vary from CPE to CPE, the number of symbols to be transmitted in bursts is usually fixed to a predetermined number n×S for all CPEs regardless of their modulation scheme.

It is desirable to simplify the configuration of time slots given fixed bursts of a group of symbols n×S and variable modulation schemes. It is noted that the modulation of L bits generates a fixed number of symbols S where $S=(L/B_1)$ and $B_1$ is the bits per symbol rate of the modulation scheme. To simplify time slot usage and bandwidth management, $(L/B_1)$ or S is ideally an integer multiple of length of the time slot $T_s$ times the baud rate R of the frame. Thus, ideally L bits fit into an integer number of time slots $T_s$ based on the modulation scheme. Note each frame has a fixed number of time slots where the length of the frame (and thus the number of time slots) is determined a function of a maximum desirable delay $T_D$ between signal transmissions and the baud rate R (symbols transmitted per second) of the system. Accordingly for each frame the number of symbols transmitted is equal to $T_D*R$. It is desirable that the number of symbols n×S or $(L/B_1)$ is an integer multiple of the number of symbols transmitted per frame. Thus, it is desirable that the ratio $(T_D*R)/(L/B_1)$ is an integer. When the ratio $(T_D*R)/(L/B_1)$ is an integer then a fixed number of bursts of n×S symbols may be transmitted in each frame. This may simplify frame usage and bandwidth management.

Figure 4:
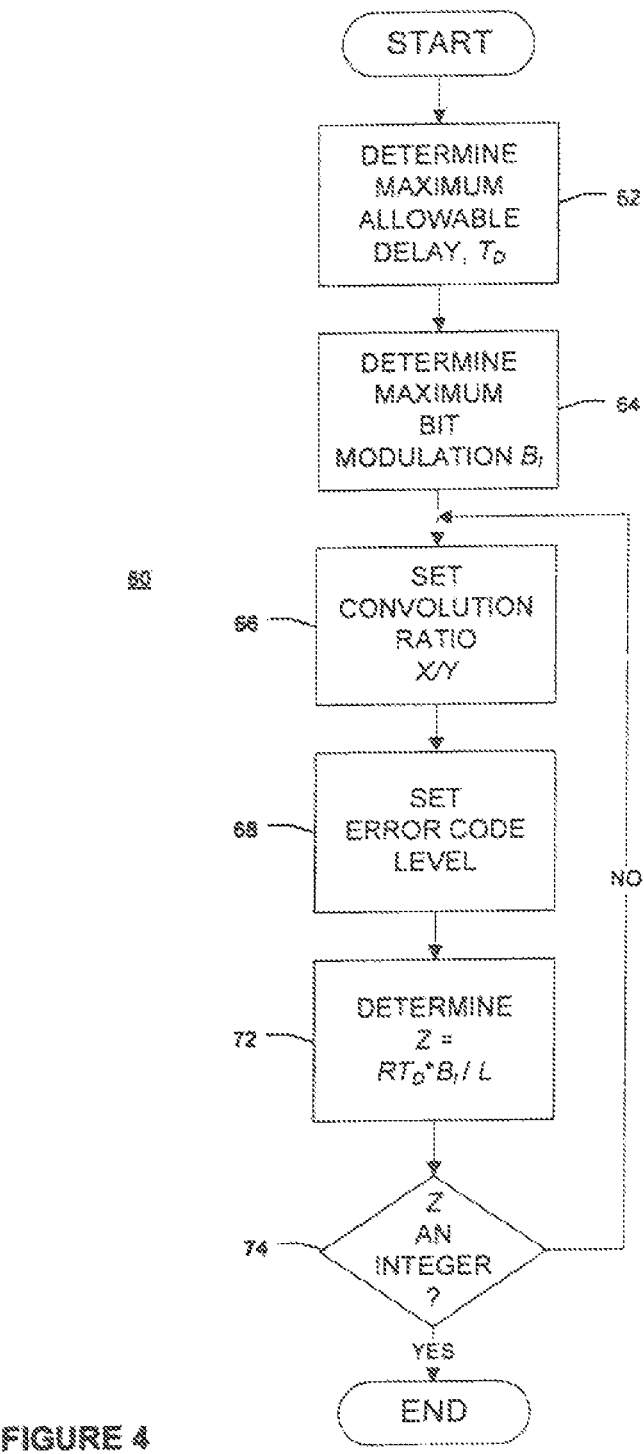
FIG. 4 is a flowchart of an exemplary process of simplifying the configuration of data to be inserted into a TDD frame in accordance with the present invention.

In most systems, the L bits of data represent an encoded signal that includes overhead or Forward Error Correction ("FEC") information where only $L_D$ of the L bits are pure data to be transmitted to a unit or base station. In these systems the number of data bits $L_D$ to be transmitted in a burst may be fixed, e.g., 256, 512, or 1024 bits. The FEC information commonly includes convolutional encoding bits and block codes including error correction encoding bits such as Reed-Solomon (RS(n,k)) data. In other embodiments, the convolutionally encoded data may also be interleaved prior to error encoding. Given that $T_D$, R, and S are fixed due to system constraints and $B_1$ is selected as a function of channel interference and modem or implementation complexity, L is ideally modified to simplify the time slot configuration or the bandwidth management of a frame. As noted, $L_D$ may also be fixed in a system. In such a system L would be determined for each possible modulation scheme of the system. FIG. 4 is a flowchart of a preferred process 60 of configuring or determining L based on $T_D$, R, and $B_1$ for the transmission of data by a unit or a base station so that frame usage is simplified.

As shown in FIG. 4, the first step, 62 of the process 60 determines the maximum allowable delay $T_D$ of the system. As noted above, the delay $T_D$ is set equal to the largest acceptable delay between transmissions of signals between CPEs or units and the base station. In step 64 the maximum bit per symbol rate modulation scheme or most complex modulation scheme that may be employed for the transmission of the $L_D$ bits is determined or selected (the process of which was described above.) Then in step 66 a convolution ratio (x/y) is selected for the $L_D$ data bits. In some embodiments no convolutional encoding is employed. In such embodiments, the ratio of (x/y) is set to 1. The convolutional ratio (x/y) is one of the parameters that may be modified to change the number of bits required to encode the $L_D$ bits of data. At step 68, the other variable parameter, the error encoding level is selected. A block code is used to reduce the Block Error Rate ("BER") of the $L_D$ bits of data to a desirable level. In a preferred embodiment, a Reed-Solomon ("RS") block code is used. The number of bits L required to encode the $L_D$ bits of data is thus set by the selection of the convolutional ratio (x/y) and the error code level.

At step 72, the value of the ratio Z of $(T_D*R)/(L/B_1)$ is determined. The baud rate R is fixed, the delay $T_D$ was determined at step 62, $B_1$ is determined at step 64, and L is determined as function of the parameters selected at steps 66 and 68. When it is determined at step 74 that the ratio Z is not integer, a different convolutional ratio (at step 66) or the error code level (at step 68) may be selected. In a preferred embodiment, the selection of the convolutional ratio and the error code level is varied as a function of the fractional remainder of the ratio Z, i.e., a convergence algorithm may be employed. As noted above, in some embodiments the convolution ratio is fixed to 1. In such embodiments, only the error code or block code level is modified. In order to ensure that the ratio Z is an integer, the number of bits used to generate the block code of data may be greater than necessary to meet the minimum BER. When at step 74, the ratio Z is determined to be an integer, then the process is complete and the block of L bits is optimized or simplified for the modulation scheme or bit per symbol rate $B_1$.

Figure 5:
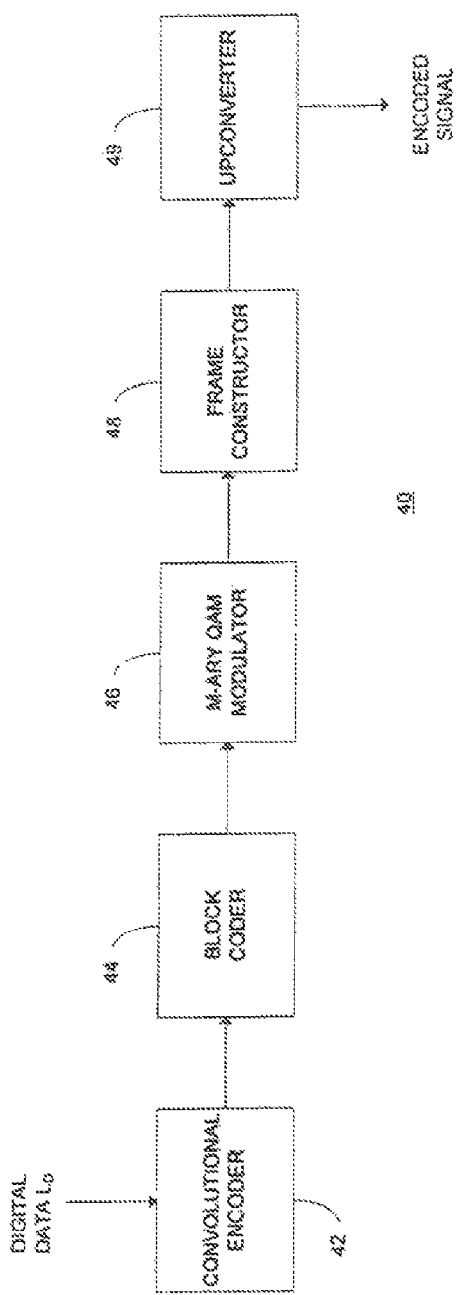
FIG. 5 is a block diagram of an exemplary transmitter for use with the present invention.
Figure 6:
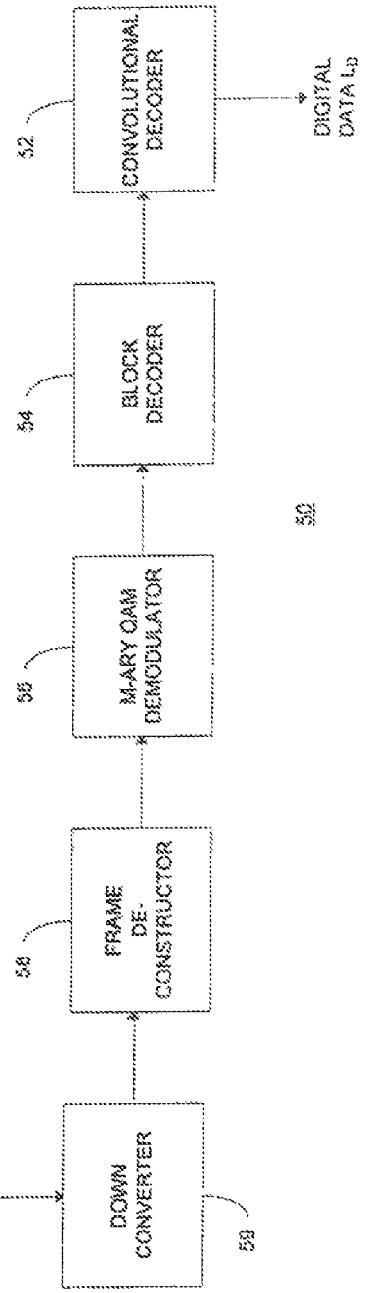
FIG. 6 is a block diagram of an exemplary receiver for use with the present invention.

A transmitter 40 and receiver 50 that may employed to transmit and receive frames of data in accordance with the present invention is presented with reference to FIGS. 5 and 6. FIG. 5 is a block diagram of an exemplary transmitter 40. As shown in this FIGURE, the transmitter 40 includes a convolutional encoder 42, block encoder 44, M-ary Modulator 46, frame constructor 48, and up-converter 49. The transmitter 40 receives the $L_D$ bits of data and encodes the data to generate L bits of data, packs the L bits of data into a frame and upconverts the frame of data to a transmission frequency. The convolutional encoder 42 and block coder 44 supply the FEC data that converts the $L_D$ bits of data into L bits of data. In particular, the convolutional encoder 42 uses the selected ratio (x/y) to encode the $L_D$ bits of data. The block coder uses the selected code level to encode the convoluted data to produce the encoded L bits of data to be transmitted to a base station or unit.

Then, the M-ary modulator converts the L bits of data into the n×S symbols based on the selected bit per symbol rate $B_1$. Due to the selection of the convolution ratio and error code level, the n×S symbols can be inserted into an integer number of times slots of a frame. The frame constructor 48 ideally inserts the n×S symbols into time slots of a frame based on the process presented with reference to FIG. 3 above, i.e., in order of the modulation scheme (from least complex to the most complex modulation scheme). Up-converter 49 frequency shifts the packed frame of data to a frequency suitable for transmission between a CPE or unit and base station based on techniques known to those of skill in the art.

The receiver 50 shown in FIG. 6 converts the frequency shifted frame of data back into groups of $L_D$ bits of data. As shown in FIG. 6, the receiver 50 includes a down-converter 59, frame deconstructor 58, M-ary demodulator 56, block decoder 54, and convolutional decoder 52. The down-converter 59 frequency shifts the received signal back to baseband using techniques known to those of skill in the art. The frame deconstructor separates the frame into groups of n×S symbols for processing by the remaining components of the receiver 50. When the receiver 50 is part of a subscriber unit, the frame deconstructor selects one of the groups of n×S symbols where the data is directed to the subscriber unit. Block decoder 54 decodes the n×S symbols using techniques known to those of skill in the art. Then, the convolutional decoder decodes the data to produce $L_D$ bits of data.

Figure 7:
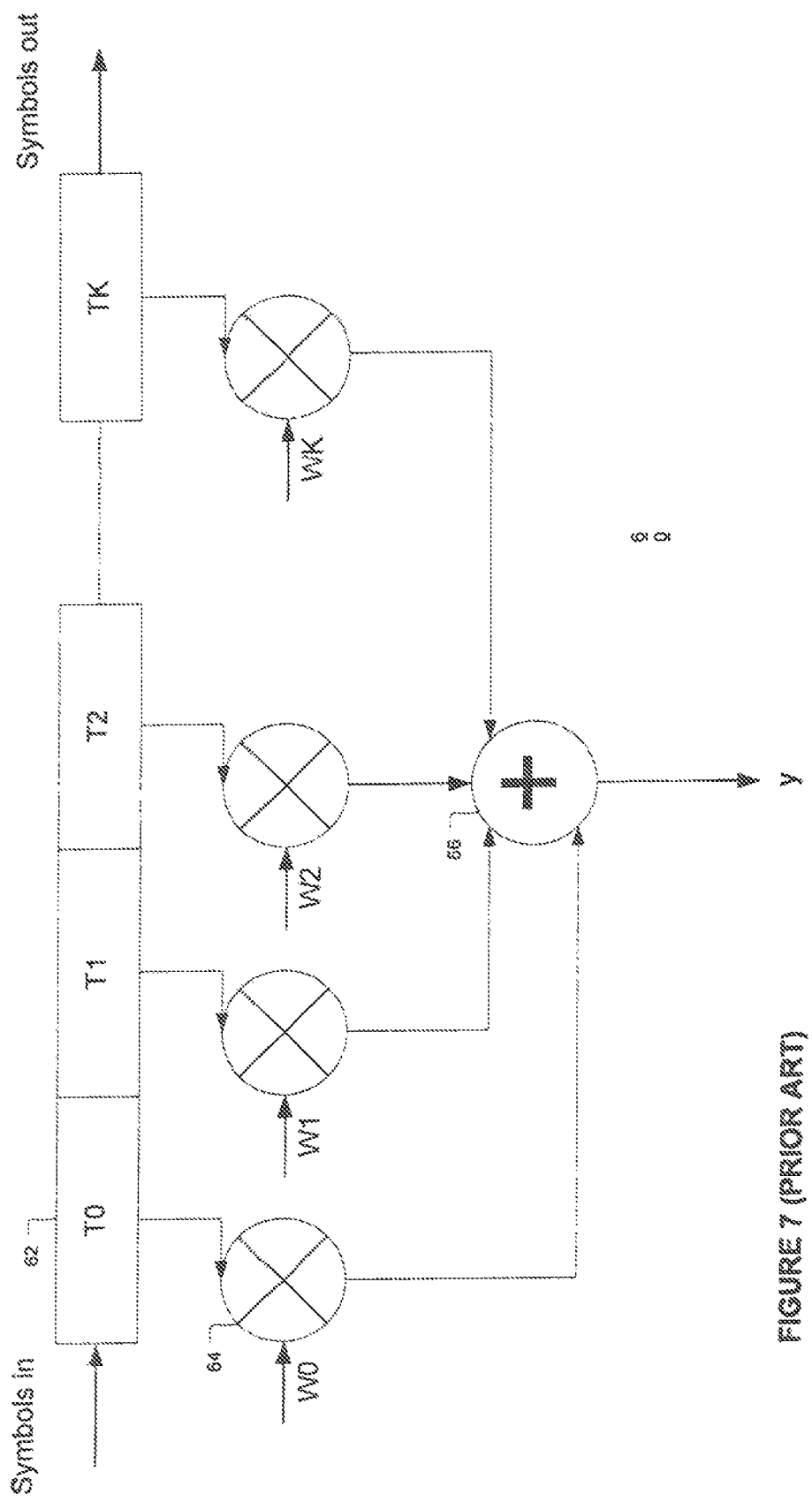
FIG. 7 is a block diagram of a prior art Finite Impulse Response ("FIR") filter suitable for use with the present invention.

The techniques and systems presented above may be modified while still falling within the scope of the appended claims. For example, symbol shaping may also be employed in a preferred embodiment to avoid spectrum spillage due to possible abrupt changes in modulation schemes in a frame as described above. Symbol shaping is commonly accomplished by filtering the n×S symbols via a Finite Impulse Response ("FIR") filter where an exemplary prior art FIR filter 60 is shown in FIG. 7. As shown in FIG. 7, the FIR filter 60 includes k multipliers and a summation node 66. Symbols S are received sequentially and stored in filter taps T0 to Tk 62. Each multiplier 64 has a tap weight W0 to Wk and tap T0 to Tk associated with a symbol stored in the taps 62. As can be seen from FIG. 7, the FIR filter 60 generates an output, y having the form $$y = \sum_{i=0}^{k} Wi * Ti.$$

It is noted that different modulation schemes, such as different QAM schemes (QAM-4, QAM-16, QAM-64) employ different "alphabets" to represent the x symbols of the scheme. For example, QAM-4 has four different symbols, QAM-16 has sixteen different symbols and QAM-64 has sixty-four different symbols. In addition, different modulation schemes may have different gains that are applied to the symbols for transmission due to varying back-off requirements. In prior art variable modulation systems when the modulation scheme changes, the memory of the FIR filter is not normally reset while the weights W0 to Wk are instantly changed to weights optimized for the modulation scheme or symbols of the scheme to prevent spectrum spillage.

This solution is not ideal, however, because the weights are then not optimized for the symbols in the memory (taps 62) of the filter that correspond to the previous modulation scheme or rate. One solution is to employ one set of weights for all modulation schemes. This solution is also not ideal, however, since the FIR filter is then not optimized for the alphabet of symbols for each modulation scheme. To prevent spectrum spillage and optimize the FIR filter 60, the present invention changes the filter taps sequentially with each new symbol from the new modulation scheme as shown in FIGS. 8A to 8F. In particular, the weight that corresponds to the first new symbol of a new modulation scheme is modified as the first new symbol propagates through the filter 60. In FIG. 8A, the filter weights W0 to Wk are optimized for the modulation scheme of the symbols currently being processed by the FIR filter 60. In FIG. 8B, the first symbol of a new modulation scheme is received in T0 of the FIR filter 60. At this point as shown in FIG. 8B, the present invention replaces the filter weight, W0 associated with T0 with a new filter weight W0' where W0' is optimized for the modulation scheme of the first new symbol stored in T0. Then, when the next symbol from the new modulation scheme is received and stored in T0 and the first new symbol is shifted to T1, the present invention replaces the filter weight, W1 associated with T1 with a new filter weight W1' where W1' is also optimized for the new modulation scheme as shown in FIG. 8C. This process is repeated as shown in FIGS. 8D to 8F until all the symbols stored in the taps 62 the FIR filter 60 belong to the new modulation scheme and all the filter weights W0 to Wk are associated with or optimized for the new modulation scheme. This technique reduces spectrum spillage while optimizing the weights employed in the FIR filter 60 to shape the symbols or varying modulation schemes.

Accordingly, it is to be understood that the invention is not to be limited by the specific illustrated embodiment, but only by the scope of the appended claims.

What is claimed is:

1. A method of operating an on-demand wireless cellular communication system for exchanging information between a base station and a plurality of mobile cellular phones, comprising:
   at the base station:
   allocate downlink transmission resources to one or more receiving mobile cellular phones in downlink time slots of a frame, and allocate uplink transmission resources to one or more transmitting mobile cellular phones in uplink time slots of the frame;
   determine per mobile cellular phone uplink modulation schemes for the uplink time slots and per mobile cellular phone downlink modulation schemes for the downlink time slots;
   encode downlink data addressed to the one or more receiving mobile cellular phones according to a respective determined downlink modulation scheme and transmit the encoded downlink data in the downlink time slots;
   receive the uplink time slots with encoded uplink data from the one or more transmitting mobile cellular phones and decode the encoded uplink data according to a respective determined uplink modulation scheme;
   encode control information using a least complex modulation scheme available in the wireless cellular communication system for control information, the control information providing the determined downlink modulation schemes for the one or more receiving mobile cellular phones and the determined uplink modulation schemes for the one or more transmitting mobile cellular phones; and
   transmit the encoded control information to the plurality of mobile cellular phones;
   at a receiving mobile cellular phone:
   receive the control information, receive the downlink encoded data addressed to the receiving mobile cellular phone in the downlink time slots, and decode the downlink encoded data based on the respective determined downlink modulation scheme; and
   at a transmitting mobile cellular phone:
   receive the control information, encode the uplink data based on the respective determined uplink modulation scheme, and transmit the encoded uplink data to the base station in the uplink time slots.

2. A method as claimed in claim 1, wherein the control information includes identification of the downlink data allocated in the downlink time slots to the one or more receiving mobile cellular phones.

3. A method as claimed in claim 1, wherein the control information includes identification of the uplink data allocated in the uplink time slots to the one or more transmitting mobile cellular phones.

4. A method as claimed in claim 1, wherein a downlink modulation scheme used for encoding downlink data for the receiving mobile cellular phone in the downlink time slots can be different from a downlink modulation scheme used for encoding downlink data to another receiving mobile cellular phone in the downlink time slots.

5. A method as claimed in claim 1, wherein an uplink modulation scheme used at the transmitting mobile cellular phone for encoding uplink data in the uplink time slots, can be different from an uplink modulation scheme used by another transmitting mobile cellular phone for encoding uplink data in the uplink time slots.

6. A method as claimed in claim 1, wherein a downlink modulation scheme used for encoding downlink data for the receiving mobile cellular phone in the downlink time slots, can be different from a downlink modulation scheme used for encoding downlink data for the receiving mobile cellular phone in subsequent downlink time slots.

7. A method as claimed in claim 1, wherein an uplink modulation scheme used by the transmitting mobile cellular phone for encoding uplink data in the uplink time slots can be different from an uplink modulation scheme used by the transmitting mobile cellular phone for encoding uplink data in subsequent uplink time slots.

8. A method as claimed in claim 1, wherein the per mobile cellular phone downlink modulation schemes are dynamically adapted according to one or more of: channel interference determined at the receiving mobile cellular phone for a downlink established to the receiving mobile cellular unit, and a maximum error level for the downlink.

9. A method as claimed in claim 8, wherein a per mobile cellular phone downlink modulation scheme is further determined based on the modulation schemes supported by the receiving mobile cellular phone.

10. A method as claimed in claim 1, wherein the per mobile cellular phone uplink modulation schemes are dynamically adapted according to one or more of: channel interference determined at the base station for an uplink established from the transmitting mobile cellular phone, and a maximum error level for the uplink.

11. A method as claimed in claim 10, wherein a per mobile cellular phone uplink modulation scheme is further determined based on the modulation schemes supported by the transmitting mobile cellular phone.

12. A method as claimed in claim 1, wherein the base station further encodes the downlink data addressed to the receiving mobile cellular phone using a forward error correction scheme.

13. A method as claimed in claim 12, wherein the forward error correction scheme adds a number of error correction bits to the downlink data.

14. A method as claimed in claim 13, wherein the number of the error correction bits is determined based on a minimum error rate for the downlink data.

15. A method as claimed in claim 12, wherein the number of the error correction bits is determined dynamically based on a minimum error rate for the downlink data, the downlink resources allocated to the receiving mobile cellular phone in the downlink time slots, and the downlink modulation scheme used by the base station for encoding the downlink data addressed to the receiving mobile cellular phone.

16. A method as claimed in claim 13, wherein the error correction bits added to the downlink data include convolutional encoding bits.

17. A method as claimed in claim 1, wherein the transmitting mobile cellular phone further encodes the uplink data addressed to the base station by using a forward error correction scheme.

18. A method as claimed in claim 17, wherein the forward error correction scheme adds a number of error correction bits to the uplink data.

19. A method as claimed in claim 18, wherein the number of the error correction bits is determined based on a minimum error rate for the uplink data.

20. A method as claimed in claim 18, wherein the number of the error correction bits is determined dynamically based on a minimum error rate for the uplink data, the uplink resources allocated to the transmitting mobile cellular phone in the uplink time slots, and the uplink modulation scheme used by the transmitting mobile cellular phone for encoding the uplink data addressed to the base station.

\* \* \* \* \*